UNITED STATES PATENT OFFICE.

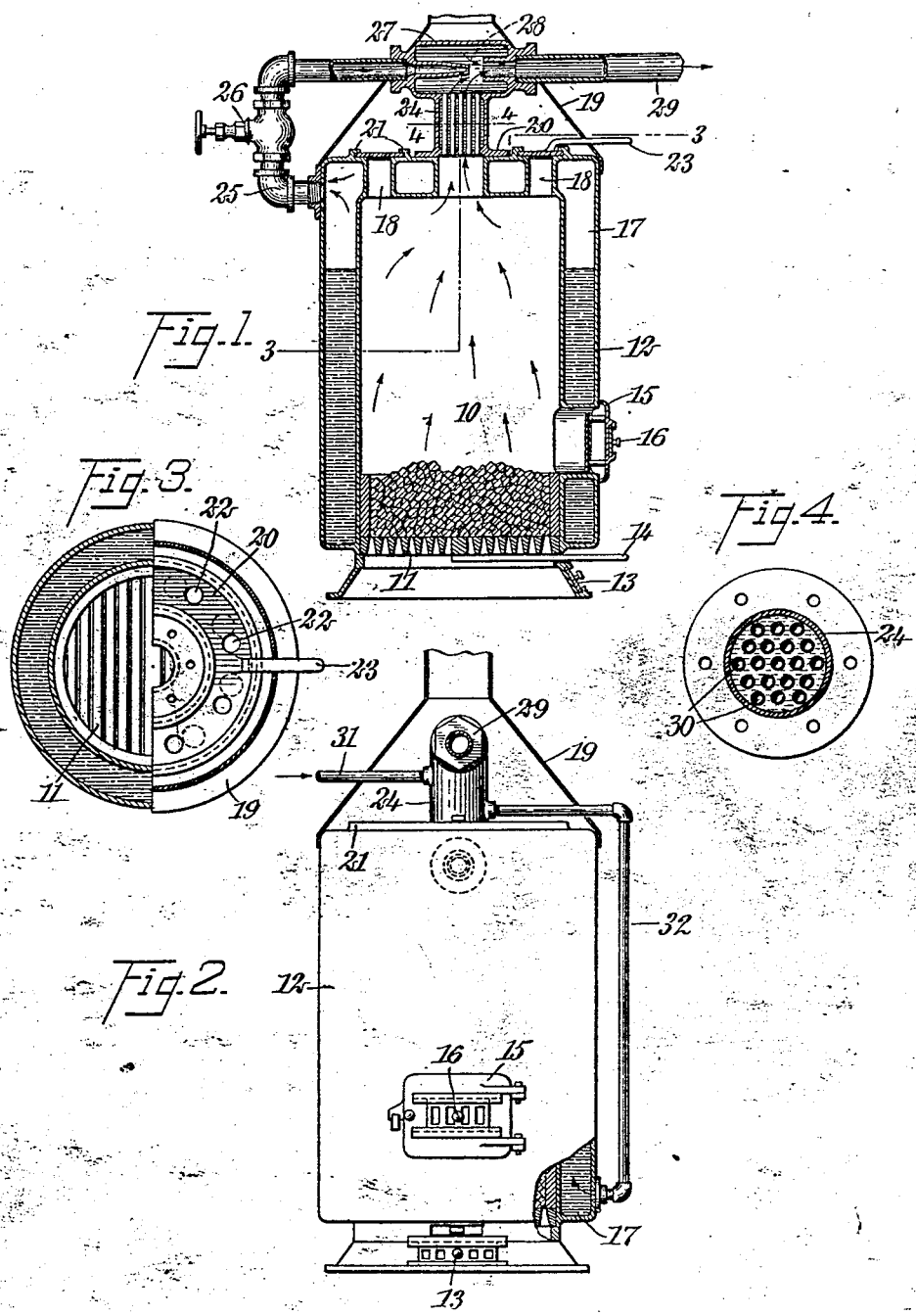

JOHN L. TATE, OF JERSEY CITY, NEW JERSEY.

MOTIVE-AGENT GENERATOR.

No. 868,372.    Specification of Letters Patent.    Patented Oct. 15, 1907.

Application filed May 11, 1907. Serial No. 373,039.

*To all whom it may concern:*

Be it known that I, JOHN LINCOLN TATE, a citizen of the United States, and a resident of Jersey City, in the county of Hudson and State of New Jersey, have invented a new and Improved Motive-Agent Generator, of which the following is a full, clear, and exact description.

This invention relates to certain improvements in means for generating motive fluids adapted for use in the projection of motive power, or for use as a heating medium, and relates more particularly to means for generating steam by the heat of combustion and delivering the steam and the gaseous products of combustion through a single conduit for employment for power or heating purposes.

The object of the invention is to provide a device in which the products of combustion are employed for preliminarily heating the water delivered to the boiler, and the steam generated in the boiler is employed for withdrawing the gaseous products of combustion and uniting with them to form a motive agent.

The invention consists in certain features of construction and combination of parts, all of which will be fully set forth hereinafter and particularly pointed out in the claims.

Reference is to be had to the accompanying drawings, forming a part of this specification, in which similar characters of reference indicate corresponding parts in all the figures, and in which Figure 1 is a central vertical section through an apparatus embodying my invention; Fig. 2 is a side elevation thereof, a portion being broken away; Fig. 3 is a transverse section on the line 3—3 of Fig. 1; and Fig. 4 is a transverse section on the line 4—4 of Fig. 1.

In the specific embodiment of my improved generator, I provide a suitable heating chamber 10 having a grate 11 at the lower end thereof for supporting the burning materials and having a jacket 12 surrounding the walls of the heater and adapted for the reception of water to be heated. The apparatus is supported upon any suitable form of base, in the side wall of which is provided a suitable draft-controlling damper 13 and shaker 14 for the grate. Access to the heating chamber may be gained through a side door 15, also provided with a draft-controlling damper 16. The heating chamber is preferably cylindrical in form and the jacket 12 is substantially parallel thereto, whereby a water-heating chamber 17 is formed completely surrounding the heating chamber 10. The water-heating chamber constitutes a boiler, and may, if desired, be provided with cross conduits connecting the opposite sides thereof, or any other common expedient may be utilized for facilitating the heating of the water. Preferably, the outer wall of the jacket is surrounded by a suitable heat insulating material.

At the upper end of the heating chamber, I provide an annular row of short conduits 18, extending through the jacket and communicating with the heating chamber. The outer ends of the conduits communicate with the outside atmosphere either directly or indirectly through a hood 19 leading to a chimney. Means are provided for completely and tightly closing these conduits, said means being illustrated as an annular plate 20 rotatable between annular guides 21 and having a plurality of openings 22 adapted to be brought into or out of registry with the ends of the conduits. With the plate in the position shown in Fig. 3, the escape of gaseous products of combustion through the conduits 18 is positively prevented. Any suitable means may be provided for rotating the plate, as, for instance, a handle member 23.

In addition to the exhaust conduits 18, I provide an independent exhaust conduit 24, having one end communicating with the heating chamber and serving to deliver the products of combustion to the same pipe as is delivered the steam from the heating jacket. As shown, the heating jacket or boiler is provided with a conduit 25 leading therefrom and having a main throttle valve 26 for controlling the escape of steam. The conduit extends into an ejector casing 27 and terminates in a discharge nozzle 28 adjacent the inlet end of the main delivery conduit 29. The interior of the ejector casing 27 communicates with the interior of the heater by means of the conduit 24.

For supplying water to the boiler or jacket and for preliminarily heating the same, I provide the conduit 24 with two end diaphragms connected by a plurality of small tubes 30, through which the gaseous products pass from the heater to the interior of the ejector casing. The main water supply pipe 31 enters the conduit 24 intermediate the diaphragms at the ends thereof, and the water after flowing around the tubes passes outward through a conduit 32 and enters the boiler at the bottom thereof, as is clearly indicated in Fig. 2. The water in passing around the pipes 30 becomes heated by the gaseous products of combustion flowing through said pipes and also serves to cool said products to such a temperature that they will not injuriously affect the moving parts of an engine.

In the operation of my improved device, the exhaust passages 18 are left open and the natural draft relied upon until the fire upon the grate has heated the water in the jacket to the desired temperature, the intensity of the fire being controlled by the dampers 13 and 16 located below and above the same. When the desired temperature and pressure is attained in the boiler, and it is desired to employ the motive agent, the throttle valve 26 is opened and the valve plate 20 rotated to close the conduits 18. The steam in escaping through the nozzle 28 into the pipe 29, creates a partial vacuum in the ejector casing 27, and the gaseous products of combustion are drawn from the heater into said casing and forced outward together with the steam through the conduit 29. The ejecting action within the heating chamber serves to facilitate the draft and increase the rate of combustion to heat the water to a still higher temperature. The hot gaseous products and the steam unite in the ejector casing, and after being delivered through the conduit 29 may be employed either for the operation of a turbine, or a rotary or reciprocating engine, or may, if desired, be delivered to heat the coils of radiators.

In my improved apparatus, all of the heat of the gaseous products of combustion which is normally wasted by being permitted to escape up the chimney, is conserved and added to and used in conjunction with the steam for heating or motive purposes. The rate of combustion is materially increased, and the temperature and pressure of the steam, as well as the temperature of the products of combustion, are increased. The adding of the products of combustion to the steam does not reduce the temperature of the latter, nor does it reduce the pressure, inasmuch as the reduced momentum of the steam in escaping through the nozzle is compensated for by the addition of the gases of approximately the same temperature.

Having thus described my invention, I claim as new and desire to secure by Letters Patent:

1. A motive agent generator, comprising a heater, a boiler, an ejector casing, an ejector nozzle within said casing, a plurality of conduits connecting said casing and said heater, a steam conduit leading from said boiler and terminating at said nozzle adjacent the outer ends of said conduits, whereby the escape of steam through said nozzle draws the products of combustion through said conduit, and a conduit delivering feed water in engagement with said first mentioned conduits and into the boiler.

2. A motive agent generator, comprising a heater, a boiler, a conduit for the products of combustion from said heater, an ejector casing within said conduit, a second conduit for the products of combustion leading from said heater to said ejector casing, an ejector nozzle within said casing, a conduit from said boiler to said nozzle, and means for controlling the escape of the products of combustion through the first mentioned conduit.

3. A motive agent generator, comprising a heater, a water jacket surrounding the same and constituting a boiler, an ejector casing, an ejecting nozzle within said casing, a plurality of conduits connecting said casing and said heater a steam conduit leading from said jacket and terminating adjacent the outer ends of said conduits, whereby the escape of steam through said nozzle draws the products of combustion through said conduits, a common exhaust conduit for the products of combustion and steam, and a conduit delivering feed water in engagement with said first mentioned conduits and into the boiler.

In testimony whereof I have signed my name to this specification in the presence of two subscribing witnesses.

JOHN L. TATE.

Witnesses:
GRANT SCOTT,
F. M. DECKER.